(12) United States Patent
Fortin et al.

(10) Patent No.: US 9,539,934 B2
(45) Date of Patent: Jan. 10, 2017

(54) VEHICLE FRONT END STRUCTURE

(71) Applicant: Nissan North America, Inc., Franklin, TN (US)

(72) Inventors: Hugo Fortin, Commerce Township, MI (US); Kouhei Tamura, Tokyo (JP); Freddy Miranda, Toluca (MX)

(73) Assignee: NISSAN NORTH AMERICA, INC., Franklin, TN (US)

(*) Notice: Subject to any disclaimer, the term of this patent is extended or adjusted under 35 U.S.C. 154(b) by 98 days.

(21) Appl. No.: 14/554,167

(22) Filed: Nov. 26, 2014

(65) Prior Publication Data

US 2016/0144900 A1 May 26, 2016

(51) Int. Cl.
| | | |
|---|---|---|
| *B60R 19/50* | (2006.01) | |
| *B60R 19/52* | (2006.01) | |
| *B60Q 1/04* | (2006.01) | |
| *B60R 19/02* | (2006.01) | |
| *E02F 3/96* | (2006.01) | |
| *B60R 19/18* | (2006.01) | |

(52) U.S. Cl.
CPC ............ *B60Q 1/0408* (2013.01); *B60R 19/023* (2013.01); *B60R 19/50* (2013.01); *B60R 19/52* (2013.01); *E02F 3/963* (2013.01); *B60R 2019/1886* (2013.01); *B60R 2019/505* (2013.01); *B60R 2019/525* (2013.01); *B60R 2019/527* (2013.01)

(58) Field of Classification Search
CPC .............. B60R 19/18; B60R 2019/186; B60R 2021/343; B60R 21/34; B60R 19/24; B60R 19/26; B60R 19/34; B60R 19/36; B60R 2019/1833; B60R 2019/1886

USPC ... 293/132, 120, 102, 115, 155; 296/187.04, 296/193.1; 273/155
See application file for complete search history.

(56) References Cited

U.S. PATENT DOCUMENTS

| | | | | |
|---|---|---|---|---|
| 4,563,028 A | * | 1/1986 | Ogawa | B60R 19/18 293/122 |
| 6,357,821 B1 | * | 3/2002 | Maj | B60Q 1/0035 296/193.09 |
| 6,523,886 B2 | * | 2/2003 | Hoffner | B60Q 1/0433 296/203.02 |
| 6,926,321 B2 | | 8/2005 | Zipfel | |

(Continued)

FOREIGN PATENT DOCUMENTS

| | | |
|---|---|---|
| DE | 10253270 A1 | 6/2004 |
| EP | 1992525 A1 | 11/2008 |
| JP | 06-316244 A | 11/1994 |

*Primary Examiner* — Glenn Dayoan
*Assistant Examiner* — Sunsurraye Westbrook
(74) *Attorney, Agent, or Firm* — Global IP Counselors, LLP (57) ABSTRACT

A vehicle front end structure includes a bumper fascia, a headlamp assembly and a front grille. The bumper fascia has a main body and a projecting portion extending upwardly from the main body. An inboard side of the projecting portion includes a flange. The headlamp assembly includes a housing installed to the bumper fascia above the main body via a projection extending in an inboard direction from an inboard side of the housing. The projection includes an attachment part releasably fastened to the flange. The front grille is installed to the bumper fascia above the main body and inboard of the projecting portion of the bumper fascia. The front grille also attaches to the flange such that the projecting portion of the bumper fascia extends between an outboard edge of the front grille and an inboard side of the lens.

19 Claims, 10 Drawing Sheets

(56) References Cited

U.S. PATENT DOCUMENTS

| | | | |
|---|---|---|---|
| 7,823,959 B2 | 11/2010 | Wallman et al. | |
| 7,857,367 B2 | 12/2010 | Narducci et al. | |
| 8,523,251 B1 | 9/2013 | Fortin et al. | |
| 8,567,853 B2* | 10/2013 | Huber | B60R 19/24 |
| | | | 293/120 |
| 2011/0204680 A1* | 8/2011 | Fortin | B60R 19/18 |
| | | | 296/193.1 |
| 2014/0132033 A1* | 5/2014 | Townson | B62D 25/084 |
| | | | 296/193.1 |

* cited by examiner

VEHICLE FRONT END STRUCTURE

BACKGROUND

Field of the Invention

The present invention generally relates to a vehicle front end structure. More specifically, the present invention relates to a vehicle front end structure that includes a bumper fascia with an attachment part that fastens to an inboard side attachment part of a headlamp assembly located between a front grille and the headlamp assembly.

Background Information

A vehicle front end structure typically includes a bumper fascia, a front grille and headlamp assemblies. The bumper fascia covers an impact absorbing bumper that extends across the front of the vehicle but is concealed by the bumper fascia. The bumper fascia is usually made of a material that is resilient and has a predetermined amount of flexibility such that the bumper fascia can elastically deform during a low speed impact event.

SUMMARY

One object of the disclosure is to provide a front bumper fascia with a visible upwardly extending projecting portion that is located between a front grille and one of the headlamp assemblies, the projecting portion being provided with attachment parts located on an inboard side of the projecting part such that the front grille and the headlamp assembly removably attach to the projecting portion.

Another object of the disclosure is to provide a front bumper fascia with a controlled deformation zone adjacent to an attachment part that is removably attached to an inboard side of a headlamp assembly, the controlled deformation zone being configured to absorb energy by deforming during a low speed impact event.

In view of the state of the known technology, one aspect of the disclosure is provide a vehicle front end structure with a bumper fascia, a headlamp assembly and a front grille. The bumper fascia has a main body and a projecting portion. The projecting portion extends upwardly from the main body, and defines an inboard side and an outboard side. The inboard side includes a flange with a first attachment part and a second attachment part. The headlamp assembly has a housing and a lens attached to the housing. The housing is installed to the bumper fascia above the main body and includes a projection that extends in an inboard direction from an inboard side of the housing. The projection further extends along a rearward surface of the flange of the projecting portion of the bumper fascia. The projection includes a third attachment part that is releasably fastened to the first attachment part of the bumper fascia. The front grille is installed to the bumper fascia above the main body and has a fourth attachment part releasably fastened to the second attachment part of the flange. The front grille covers the first attachment part and the third attachment part of the flange of the projecting portion. The projecting portion of the bumper fascia extends between an outboard edge of the front grille and an inboard side of the lens. The main body, the projecting portion, an outer surface of the lens and an outer surface of the front grille define a contoured outer front surface of a vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
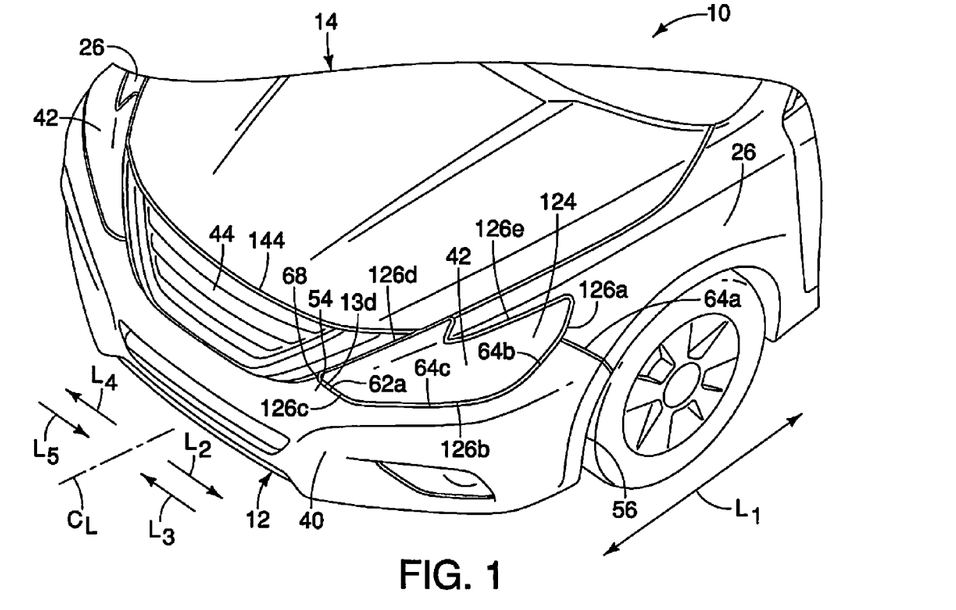
FIG. 1 is a perspective view of a front of a vehicle that includes a front end structure in accordance with a first embodiment.

Referring initially to FIG. 1, a vehicle 10 is illustrated in accordance with a first embodiment. The vehicle 10 includes a front end structure 12 shown separated from the vehicle 10 in FIG. 2, as is described in greater detail below.

As shown in FIG. 1, the vehicle 10 defines a plurality of directions that are used throughout the description below in describing various features of the front end structure 12. For example, the vehicle 10 defines a center line $C_L$ that extends front to back through a center of the vehicle 10. Further, the vehicle 10 defines a longitudinal direction $L_1$, with the longitudinal direction $L_1$ representing directions that are parallel to the center line $C_L$. The vehicle 10 further defines an outboard direction $L_2$ and inboard direction $L_3$ that are directions approximately perpendicular to both the longitudinal direction $L_1$ and the center line $C_L$ relative to a first lateral side of the vehicle 10. Similarly, the vehicle 10 defines an outboard direction $L_4$ and inboard direction $L_5$ that are directions approximately perpendicular to both the longitudinal direction $L_1$ and the center line $C_L$ relative to a second lateral side of the vehicle 10 opposite the first lateral side. In the description below, the features of the front end structure 12 on the first lateral side of the vehicle 10 are generally symmetrically the same (but mirror images) as features of the front end structure 12 on the second lateral side of the vehicle 10, with respect to the center line $C_L$ of the vehicle 10. Therefore, description of features on the first lateral side of the center line $C_L$ generally apply equally to description of features on the second lateral side (opposite the first side) of the center line $C_L$.

Figure 3:
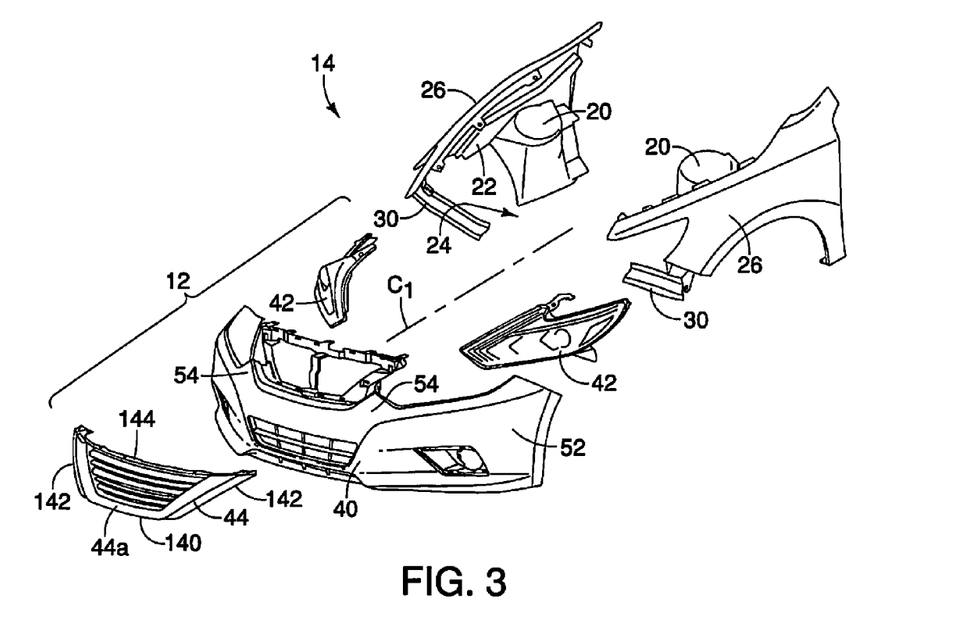
FIG. 3 is an exploded view of a front end portion of the vehicle depicted in FIG. 1, showing the bumper fascia, the front grille and the headlamp assemblies along with structural features of the vehicle in accordance with the first embodiment.

As shown in FIGS. 1 and 3, the vehicle 10 has a body structure 14 that includes the front end structure 12. The body structure 14 further includes many conventional features whose description is omitted for the sake of brevity. To assist in the understanding of the front end structure 12, only select features of the body structure 14 are described herein below.

Figure 8:
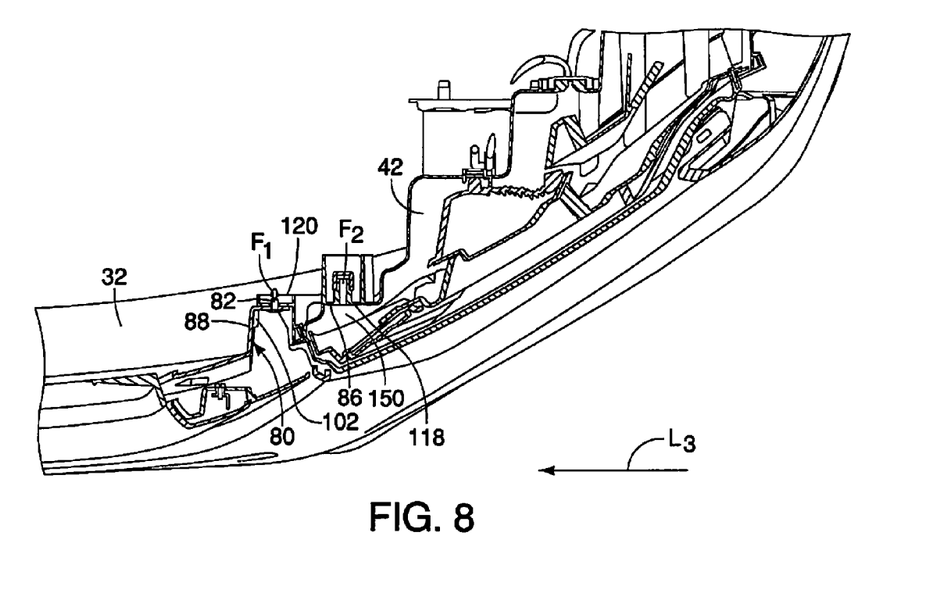
FIG. 8 is a top cross-sectional view of the front end structure taken along the line 8-8 in FIG. 6, showing the one of the headlamp assemblies and the front grille attachments to the bumper fascia in accordance with the first embodiment.

As shown in FIG. 3, the body structure 14 includes structural elements such as strut towers 20 and inner fenders 22. Each respective strut tower 20 is rigidly fixed to the adjacent inner fender 22. An engine compartment 24 is defined between the strut towers 20 and inner fenders 22. Outer fenders 26 are fixed to the inner fenders 22 in a conventional manner. At front ends of the inner and outer fenders 22 and 26, a cross-brace 30 connects opposite pairs of the fenders 22 and 26. The cross-brace 30 is configured to support, for example, an engine radiator (not shown), an air conditioner condenser (not shown) and a front bumper 32 (shown in FIG. 8).

The strut towers 20 are rigidly connected to front side members (not shown) that extend in the vehicle longitudinal direction $L_1$ in a lower area of the engine compartment 24. The cross-brace 30 can further be connected to front ends of the front side members (not shown). The strut towers 20 and the inner fenders 22 are also rigidly fixed to one or more of the following structural elements: a dash wall (not shown), A-pillars (not shown) and/or other structural elements (not shown) of the body structure 14. It should be understood from the drawings and the description herein that the configuration and structural connections between the various elements mentioned above can vary from vehicle to vehicle. Therefore, the specific connection points between various vehicle designs can vary accordingly, as the design criteria of the specific vehicle requires.

Figure 2:
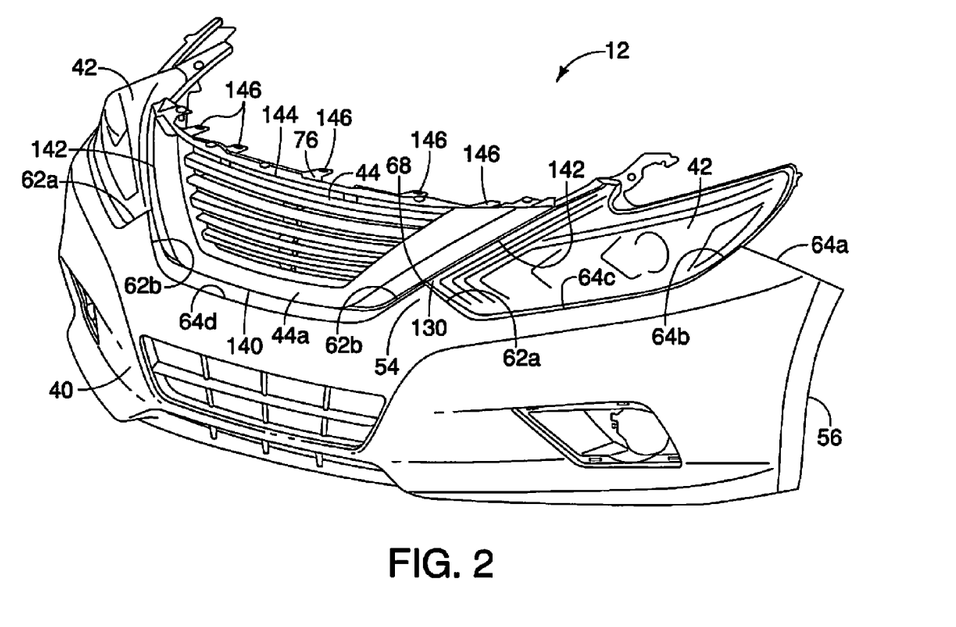
FIG. 2 is a perspective view of the front end structure showing a bumper fascia, a front grille and headlamp assemblies assembled to one another in accordance with the first embodiment.

As shown in FIGS. 2 and 3, the front end structure 12 basically includes a bumper fascia 40, headlamp assemblies 42 and a front grille 44. The front end structure 12 can include various other elements whose description is omitted for the sake of brevity.

There are two headlamp assemblies 42. However, as mentioned above, the headlamp assemblies 42 are located on opposite sides of the centerline $C_L$ of the vehicle 10, and are therefore symmetrically identical to one another, except that they are mirror images of one another. Therefore, description of one of the headlamp assemblies 42 and its relationship to the bumper fascia 40 and the front grille 44, applies equally to both headlamp assemblies 42.

A description of the bumper fascia 40 is now provided with specific reference to FIGS. 2-9. The bumper fascia 40 is made of a resilient material that is dimensioned to elastically deform in response to low speed impact events. The bumper fascia 40 has a contoured shape with a visible curve, as shown in FIGS. 1 and 3. However, overall, the bumper fascia 40 extends from the centerline $C_L$ in both outboard lateral directions $L_2$ and $L_4$ to the outer fenders 26.

The bumper fascia 40 basically includes a main body 52 and two projecting portions 54. The main body 52 has two curved wheel well edges 56. The main body 52 extends from one wheel well edge 56 to the opposite wheel well edge 56, thereby wrapping around the front of the vehicle 10. Each of the wheel well edges 56 at least partially defines a front wheel well along with a mating edge of the outer fenders 26.

Since the main body 52 is symmetrically shaped relative to the center line $C_L$ of the vehicle 10, only one lateral side of the main body 52 is described in great detail below, for the sake of brevity. Further, there are two projecting portions 54 located on opposite sides of the main body 52 relative to the center line $C_L$ of the vehicle 10. The two projecting portions 54 are identical except that they are mirror images of each other, being symmetrical about the center line $C_L$. A description of one of the projecting portions 54 below, applies equally to both. Therefore, description of only one of the projecting portions 54 is provided in detail below, for the sake of brevity. However, in the description below, both projecting portions 54 are referred to occasionally to more thoroughly describe the structures of the bumper fascia 40.

Figure 4:
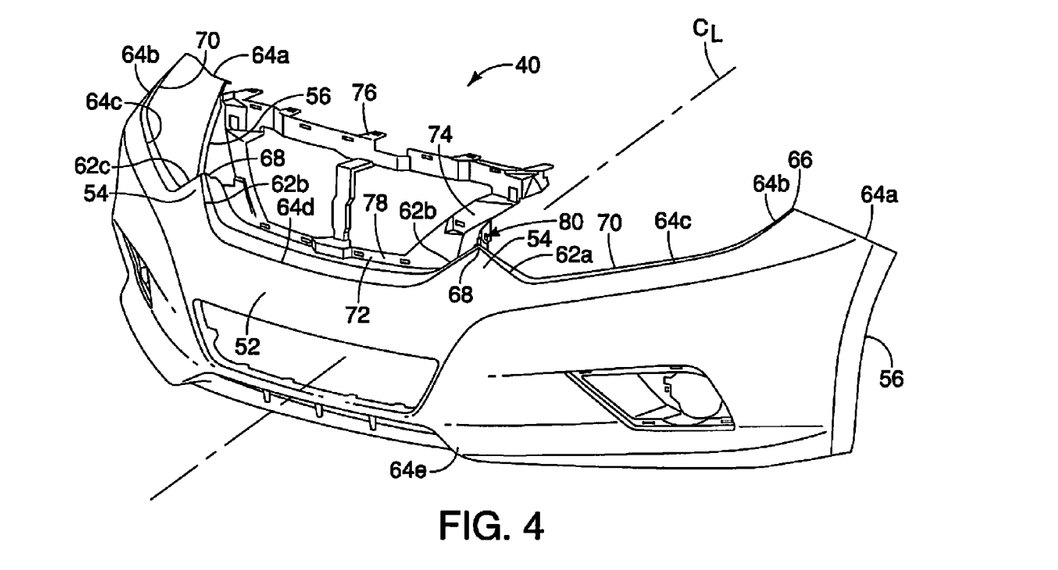
FIG. 4 is a perspective view of the bumper fascia removed from the front end structure, showing a projection portion that includes a flange along an inboard side of the projecting portion, the flange including a first attachment part and a second attachment part in accordance with the first embodiment.

The main body 52 and the projecting portions 54 have a plurality of features and contours. Among those features, the main body 52 and the projecting portions 54 define a continuous (uninterrupted) front finished surface 60 that is exposed with the front end structure 12 completely assembled and installed to the vehicle 10. The front finished surface 60 includes a plurality of surface contours and shapes as shown in FIGS. 2 and 4. An upper periphery of the front finished surface 60 is bounded by a plurality of edges. Specifically, each of the projecting portions 54 includes an outboard edge 62*a* and an inboard edge 62*b*. The main body 52 includes a fender edge 64*a*, a first headlamp edge 64*b*, a second headlamp edge 64*c*, and a main grille edge 64*d*.

Hence, the front finished surface 60 has an upper boundary that is defined by the following edges from the first lateral side of the vehicle 10 to the center line $C_L$: the fender edge 64*a*, the first headlamp edge 64*b*, a second headlamp edge 64*c*, the outboard edge 62*a*, the inboard edge 62*b* and the main grille edge 64*d*. A lower boundary of the front finished surface 60 is a bottom edge 64*e* of the main body 40 of the bumper fascia 40.

As shown in FIG. 1, the fender edge 64*a* of the main body 52 of the bumper fascia 40 mates with an edge of the adjacent outer fender 26 such that the front finished surface 60 mates with an outer finished surface of the outer fender 26.

Further, as shown in FIG. 4, the fender edge 64*a* and the first headlamp edge 64*b* define an upper rearward corner 66 of the main body 52. The first headlamp edge 64*b* extends downward from the upper rearward corner 66 and is curved as it intersects with the second headlamp edge 64*c*. The second headlamp edge 64*c* of the main body 52 and the outboard edge 62*a* of the projecting portion 54 curve toward one another in the area of their intersection. The outboard edge 62*a* and the inboard edge 62*b* of the projecting portion 54 intersect defining a corner or point 68. The inboard edge 62*b* and the main grille edge 64*d* curve toward one another in the area of their intersection.

The bumper fascia 40 further defines a headlamp receiving area 70 that is defined immediately above the first and second headlamp edges 64*b* and 64*c* of the main body 52 and the outboard edge 62*a* of the projecting portion 54. The bumper fascia 40 also defines a front grille receiving area 72 that is defined above the main grille edge 64*d* and between the inboard edges 62*b* of the two projecting portions 54.

The projecting portion 54 of the bumper fascia 40 also includes a flange 74 that is located inboard relative to the inboard edge 62*a* of the front finished surface 60. More specifically, the flange 74 is offset rearward relative to the front finished surface 60. The flange 74 extends alongside the inboard edge 62*a* of the front finished surface 60 and also extends further upward above the projecting portion 54 and the point 68.

The main body 52 includes a cross-member 76 that extends laterally between the upper ends of the flanges 74 of the projecting portions 54, as shown in FIG. 4. The main body 52 also includes a lower flange 78 that extends between lower ends of the flanges 74. The flanges 74, the cross-member 76 and the lower flange 78 are all rearwardly offset from the front finished surface 60. In the depicted embodiment, the main body 52, the projecting portions 54, the flanges 74, the cross-member 76 and the lower flange 78 are all unitarily formed as a single monolithic element, thereby defining the bumper fascia 40. Further, the bumper fascia 40 (and all of the above portions thereof) is made of the same resilient material, such as thermoplastic olefins (TPOs), polycarbonates, polyesters, polypropylene, polyurethanes, polyamides, or blends of these with, for instance, glass fibers, for strength and a predetermined level of structural rigidity.

There are two flanges 74 formed on the bumper fascia 40. The flanges 74 are basically identical, but are mirror images of each other being symmetrical with respect to the center line $C_L$ of the vehicle 10. Therefore, description of one of the flanges 74 applies equally to both. Hence, only one of the flanges 74 is described herein below for the sake of brevity.

Figure 7:
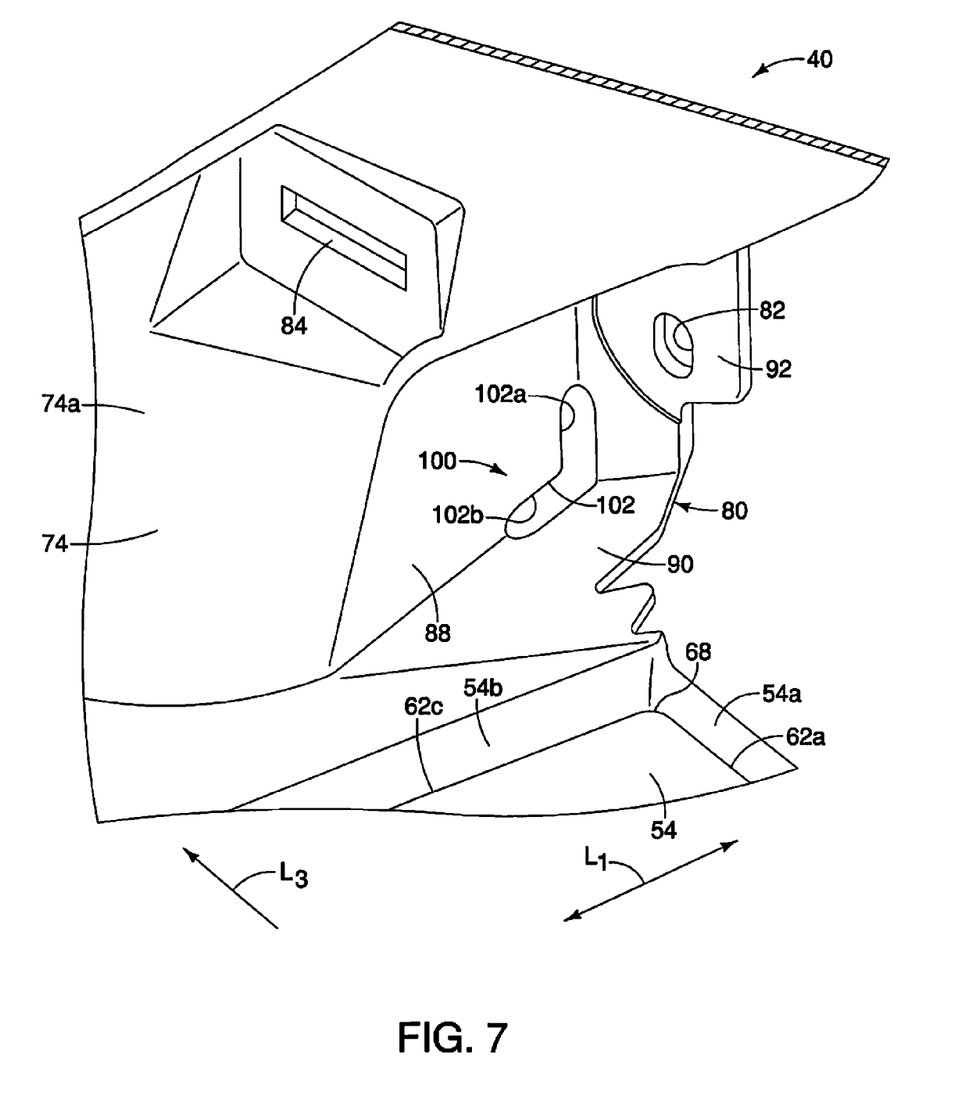
FIG. 7 is a perspective view of a portion of the bumper fascia showing a doghouse structure that includes the first attachment part that attaches to the headlamp assembly and a second attachment part above the first attachment part, the second attachment part configured for attaching to the front grille, and the doghouse structure including a slotted area that at least partially defines a controlled deformation zone in accordance with the first embodiment.

As shown in FIG. 7, the projecting portion 54 has an outboard side 54*a* and an inboard side 54*b*. The flange 74 extends along the inboard side 54*b* of the projecting portion 54 but extends further above the projecting portion 54 and above the point 68. The flange 74 includes a doghouse structure 80 that defines a first attachment part 82. The flange 74 also includes a second attachment part 84 that is adjacent to the first attachment part 82. The flange 74 further includes an upper grille attachment part 86 that is located above the first and second attachment parts 82 and 84. The flange 74 has a forward facing surface 74*a* shown in FIGS. 5 and 7, and a rearward facing surface 74*b* shown in FIGS. 8, 9 and 12.

The doghouse structure 80 includes an upright surface 88, a lower surface 90, and a recessed surface 92. The upright surface 88 extends rearward from the forward facing surface 74*a* of the flange 74. The lower surface 90 extends rearward from the forward facing surface 74*a* and further extends in an outboard direction from the upright surface 88. The recessed surface 92 is a vertically extending surface that is perpendicular to the upright surface 88. The recessed surface 92 is rearwardly offset from the forward facing surface 74*a* of the flange and intersects with both the upright surface 88 and the lower surface 90.

In the depicted embodiment, the first attachment part 82 is defined by a fastener receiving opening (82) that extends completely through the recessed surface 92. The second attachment part 84 is similarly defined by a rectangularly shaped opening (84) whose function is described in greater detail below.

Figure 17:
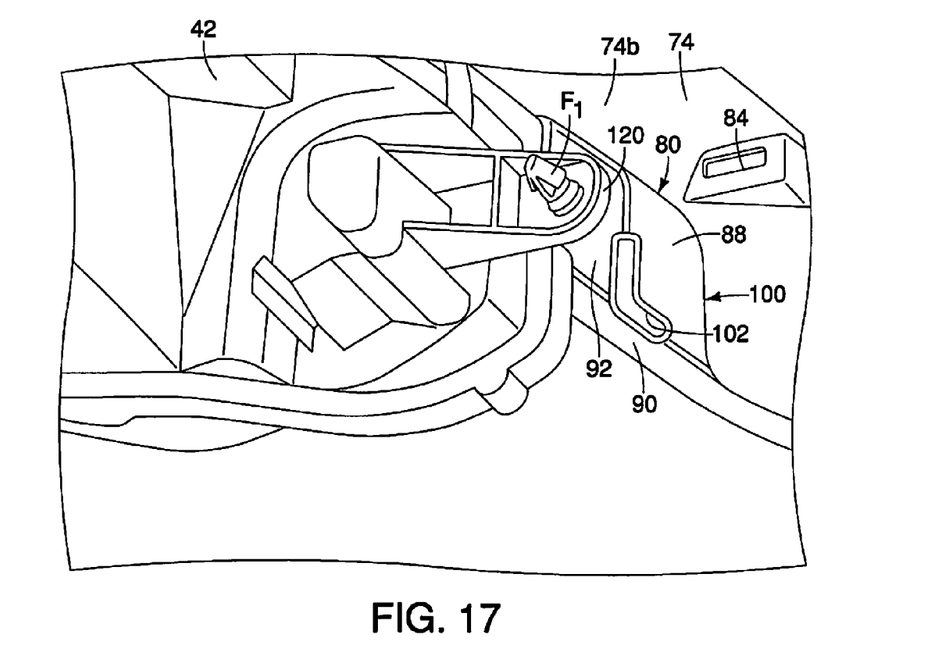
FIG. 17 is a perspective view of a portion of the front end structure showing the doghouse structure of the flange of the projecting portion of the bumper fascia and the projection of the headlamp assembly attached to one another with the doghouse structure and the controlled deformation zone in an un-impacted orientation prior to a low speed impact event in accordance with the first embodiment.
Figure 18:
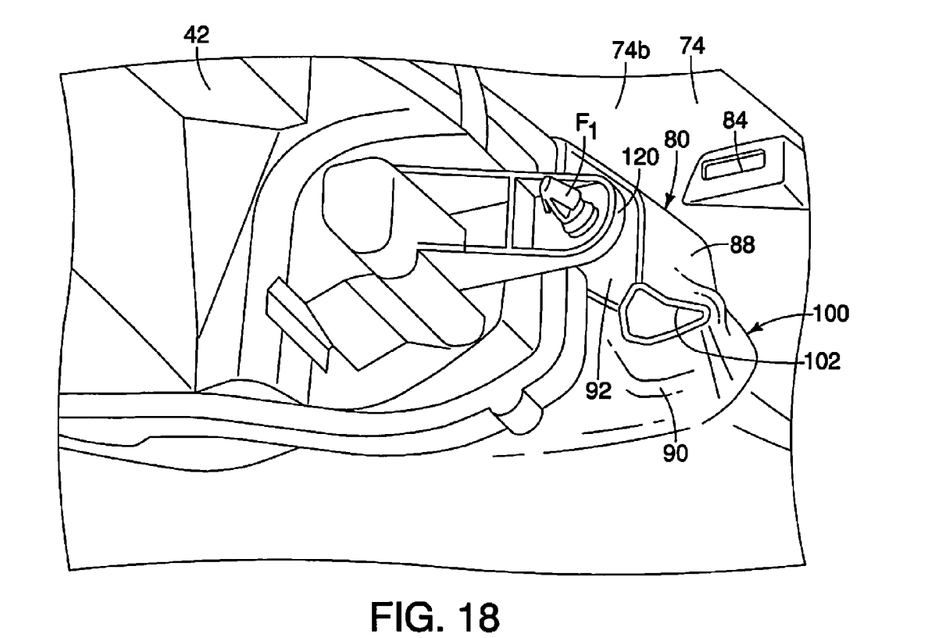
FIG. 18 is another perspective view of the portion of the front end structure depicted in FIG. 17 showing the doghouse structure and the controlled deformation zone in an impacted deformed orientation after a low speed impact event in accordance with the first embodiment.

The doghouse structure 80 also includes a controlled deformation zone 100 located in an area corresponding to a convergence of the upright surface 88, the lower surface 90 and the recessed surface 92 and adjacent to the first attachment part 82 such that in response to a low speed impact event areas of the doghouse structure 80 adjacent to and in the area of the controlled deformation zone 100 deform, as demonstrated in FIGS. 17 and 18. The controlled deformation zone 100 is defined by a slot 102 that extends through a portion of the doghouse structure 80. The slot 102 is basically a cutout located in the area where the upright surface 88, the lower surface 90 and the recessed surface 92 would otherwise intersect. The slot 102 is adjacent to the first attachment part 82. The slot 102 basically includes two sections, an upright section 102*a* and a horizontal section 102*b*. The upright section 102*a* extends in a vertical direction and the horizontal section 102 extends in a horizontal direction.

A description of the headlamp assemblies 42 is now provided with specific reference to FIGS. 8-12. The headlamp assembly 42 includes at least a housing 110 and a lens 112 that is attached to the front of the housing 110. The housing 110 includes a plurality of attachment parts, including a fascia attachment part 114, an inner fender attachment part 116, a grille attachment part 118 and a projection 120. The fascia attachment part 114 is configured to attach to a corresponding portion of the bumper fascia 40 in a conventional manner. Therefore, further description of the fascia attachment part 114 is omitted for the sake of brevity. The inner fender attachment part 116 is configured to attach to a corresponding portion of the inner fender 22 in a conventional manner. Therefore, further description of the fender attachment part 116 is omitted for the sake of brevity. It should be understood from the drawings and the description herein that the headlamp assemblies 42 can include additional attachment parts and/or alignment parts.

Figure 5:
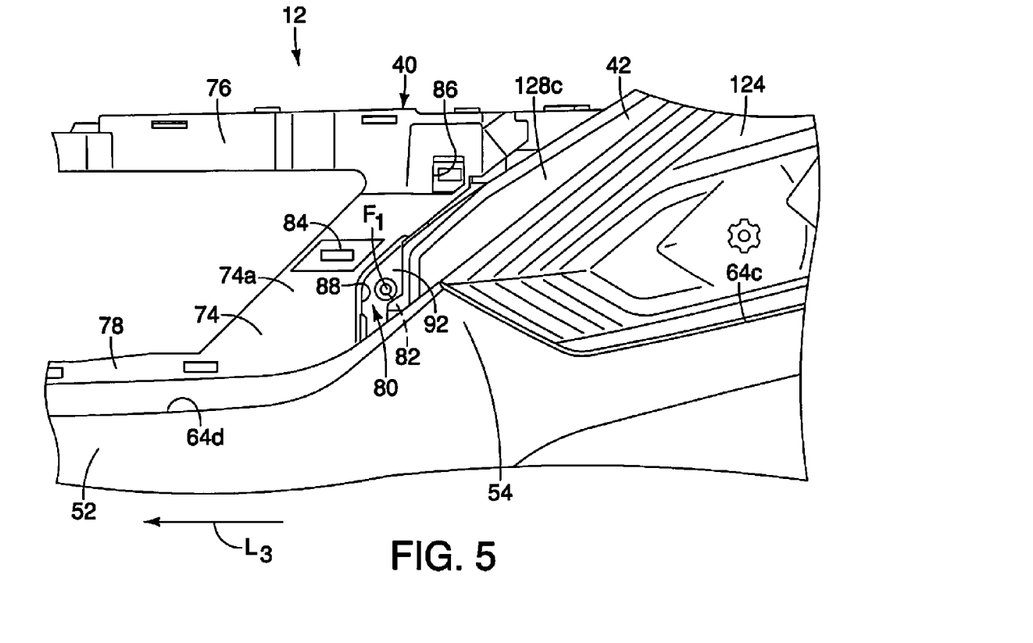
FIG. 5 is a front view of the bumper fascia showing an inboard side of one of the headlamp assemblies attached to the first attachment part in accordance with the first embodiment.
Figure 6:
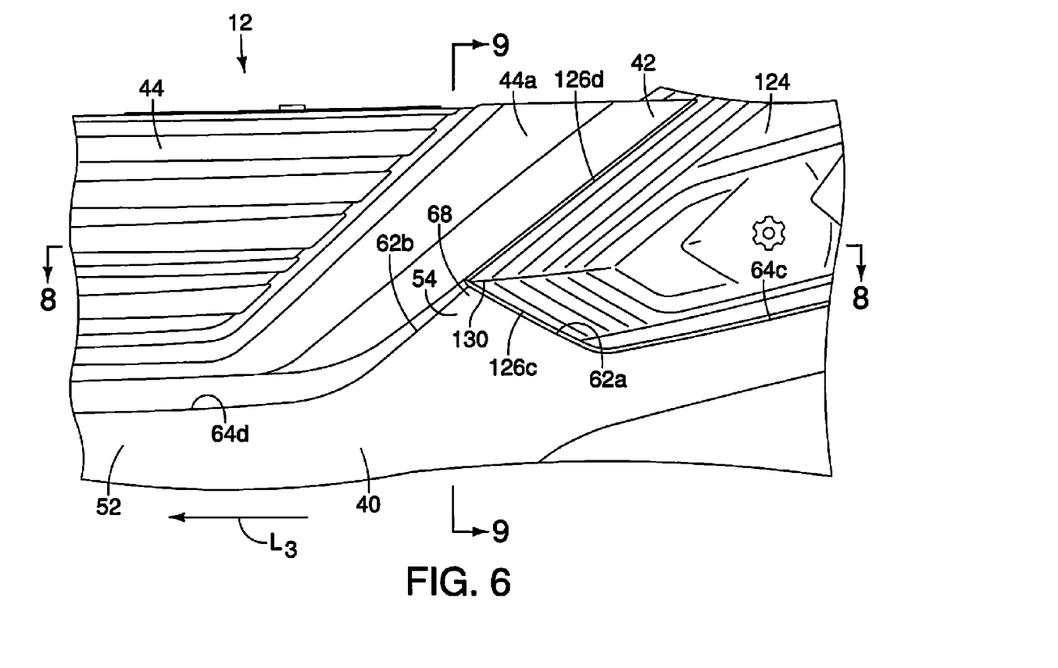
FIG. 6 is another front view of the bumper fascia similar to FIG. 5 showing the one of the headlamp assemblies and the front grille attached to the bumper fascia in accordance with the first embodiment.
Figure 11:
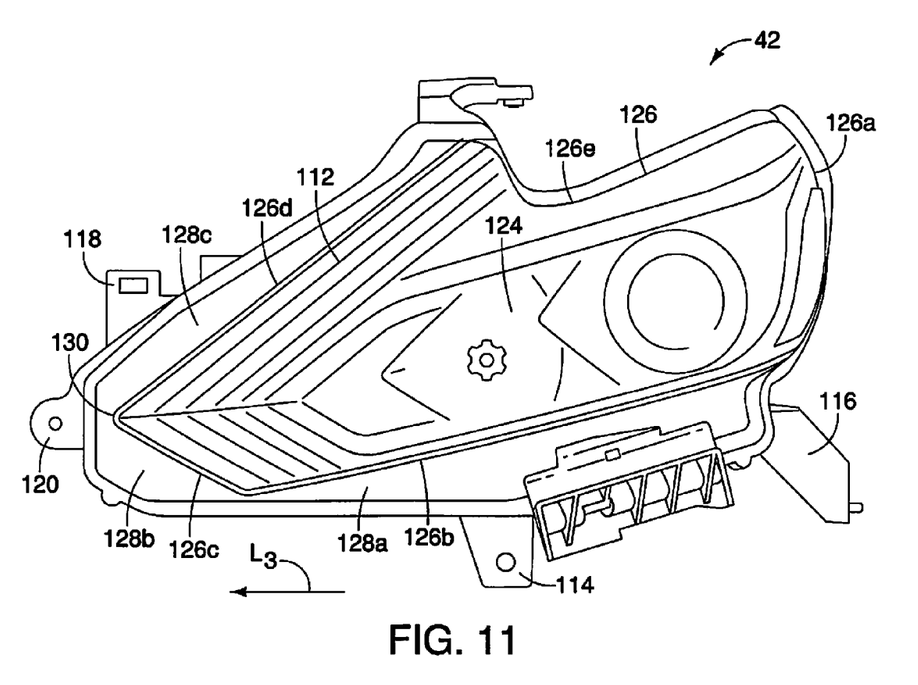
FIG. 11 is a front view of the one of the headlamp assemblies showing the projection that extends from the inboard side of the headlamp assembly in accordance with the first embodiment.

As shown in FIG. 11, the lens 112 includes a main lens area 124 that is bound by a peripheral edge 126 that includes an outboard edge 126a, a lower edge 126b, a lower inboard edge 126c, an upper inboard edge 126d and a contoured upper outboard edge 126e. As shown in FIG. 11, the lens 112 and the housing 110 together also define flange areas 128a, 128b and 128c adjacent to sections of the peripheral edge 126 outside of the main lens area 124. As shown in FIG. 5, with the headlamp assembly 42 installed to the bumper fascia 40, the flange areas 128a and 128b are covered and hidden from view. As shown in FIG. 6, with the front grille 44 installed to the bumper fascia 40 and the headlamp assembly 42, the flange area 128c is also covered and hidden from view leaving only the main lens area 124 exposed.

Hence, as shown in FIG. 1, with the front end structure 12 fully assembled and installed to the vehicle 10, only the main lens area 124 of the headlamp assembly 42 is visible. Further, the outboard edge 126a of the main lens area 124 extends alongside a forward end of the outer fender 26 and the first headlamp edge 64b of the main body 52 of the bumper fascia 40. The lower edge 126b of the main lens area 124 extends alongside the second headlamp edge 64c of the main body 52 of the bumper fascia 40. The lower inboard edge 126c extends alongside the outboard edge 62a of the projecting portion 54 of the bumper fascia 40. The upper inboard edge 126d extends alongside a portion of the front grille 44 and a portion of the hood of the vehicle 10. As well, the contoured upper outboard edge 126e extends along a corresponding contoured portion of the outer fender 26.

As shown in FIGS. 6 and 11, the lower inboard edge 126c and the upper inboard edge 126d intersect defining a tapered inboard end 130 of the main lens area 124.

As shown in FIGS. 5, 6, 8 and 9, the housing 110 is installed to the bumper fascia 40 above the main body 52. As shown in FIGS. 12-16 in the installed state, the projection 120 extends in the inboard direction $L_3$ from an inboard side of the housing 110 along the rearward surface 74b of the flange 74. The projection 120 is basically a third attachment part that includes an aperture or opening that receives a fastener $F_1$ that releasably fastens to the first attachment part of the bumper fascia. The fastener $F_1$ is preferably a snap-fitting fastener.

Figure 9:
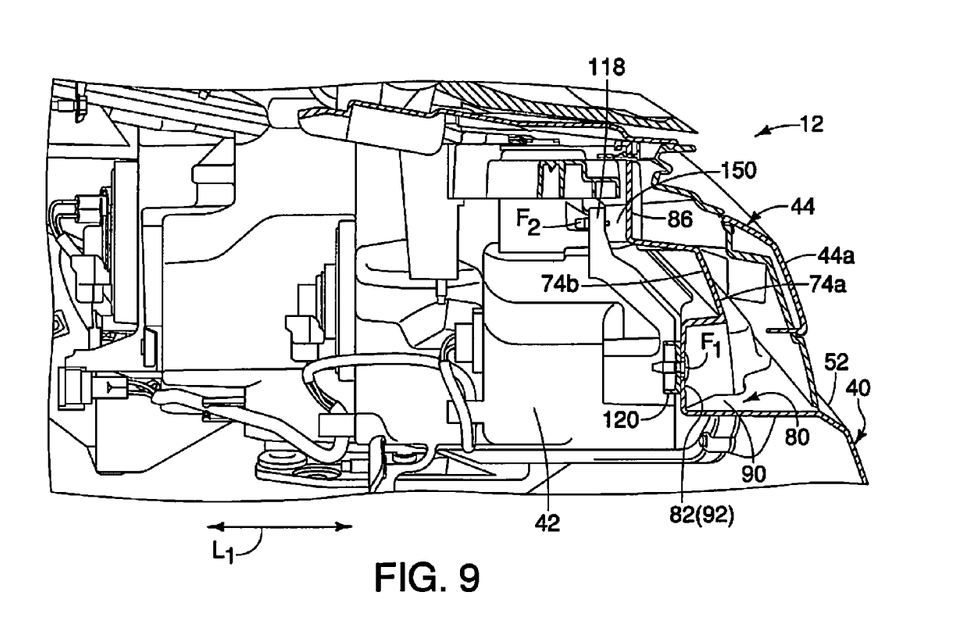
FIG. 9 is a side cross-sectional view of the front end structure taken along the line 9-9 in FIG. 6, showing the one of the headlamp assemblies and the front grille attachments to the bumper fascia in accordance with the first embodiment.
Figure 10:
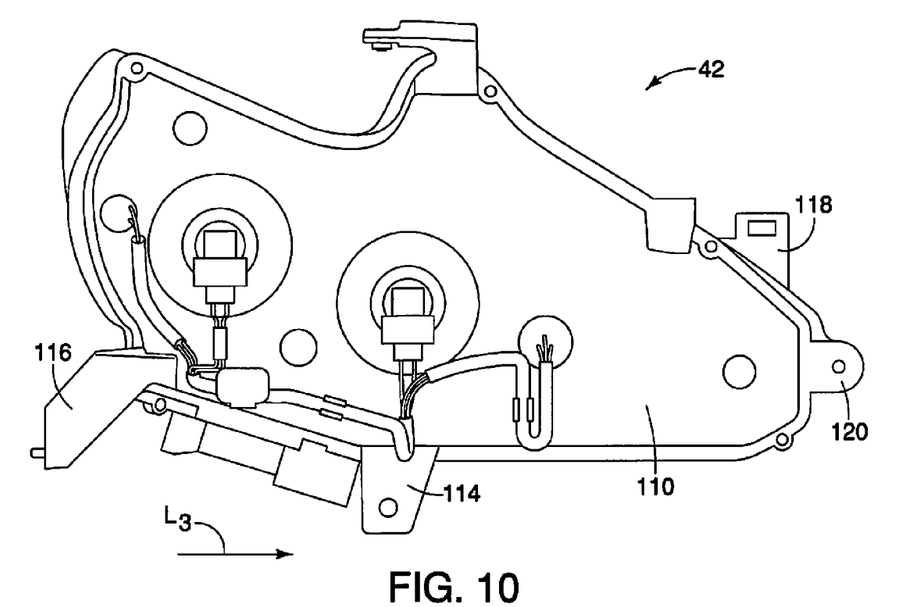
FIG. 10 is a rear view of the one of the headlamp assemblies showing a projection that extends from an inboard side of the headlamp assembly in accordance with the first embodiment.
Figure 12:
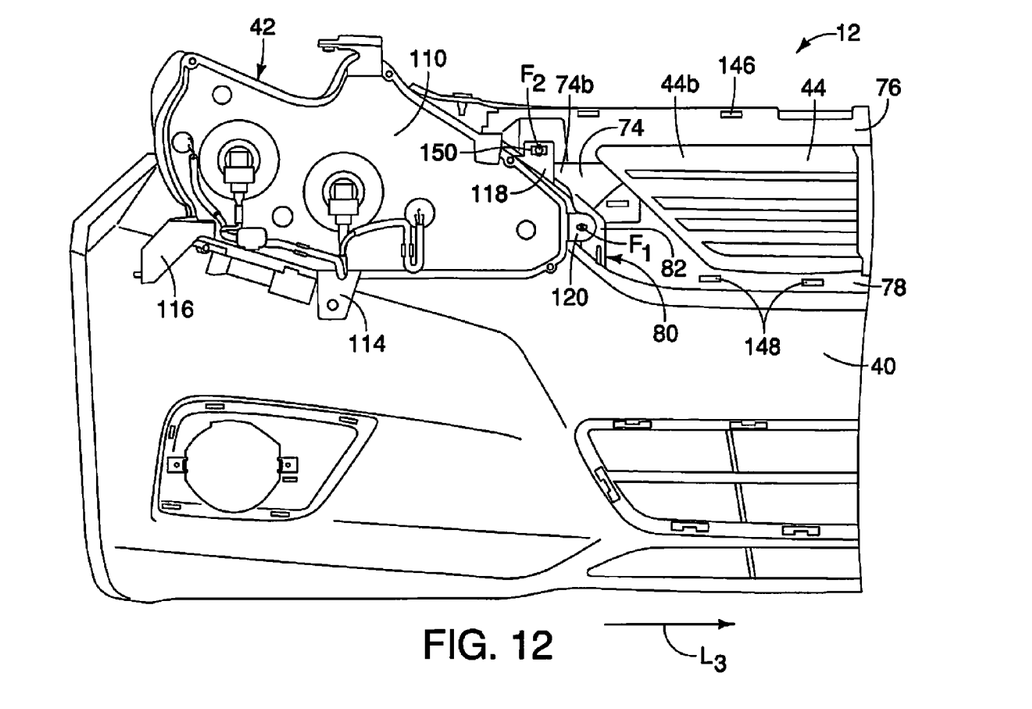
FIG. 12 is a rear view of the front end structure showing the attachments between the front grille, the headlamp assembly and the bumper fascia in accordance with the first embodiment.
Figure 13:
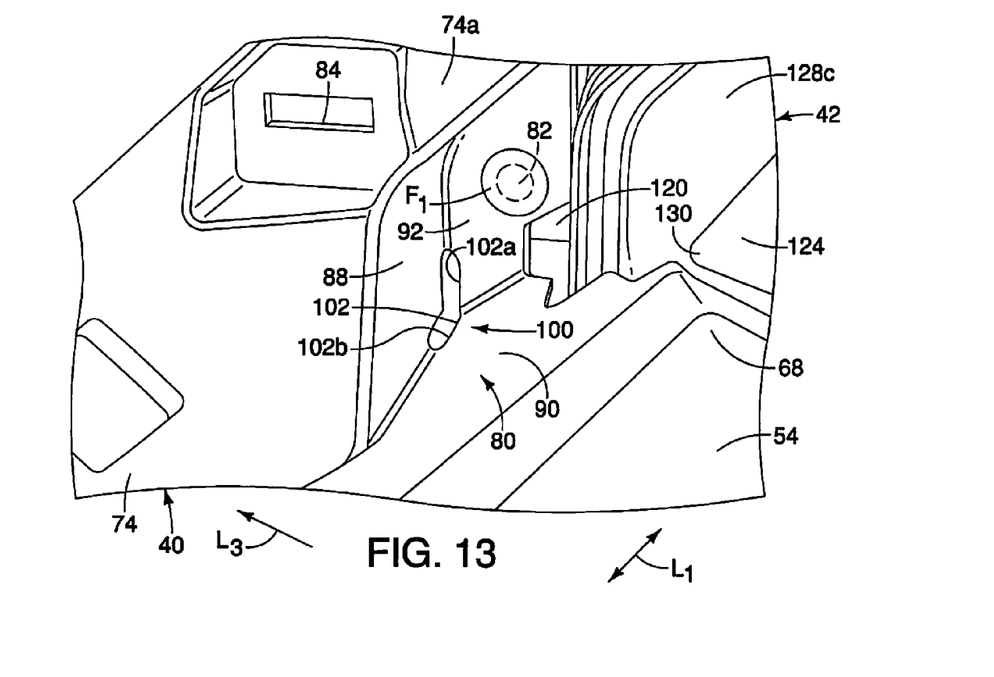
FIG. 13 is a front perspective view of the flange of bumper fascia showing the projection of the headlamp assembly attached to the first attachment part, and showing the slotted area of the doghouse structure that at least partially defines the controlled deformation zone in accordance with the first embodiment.
Figure 14:
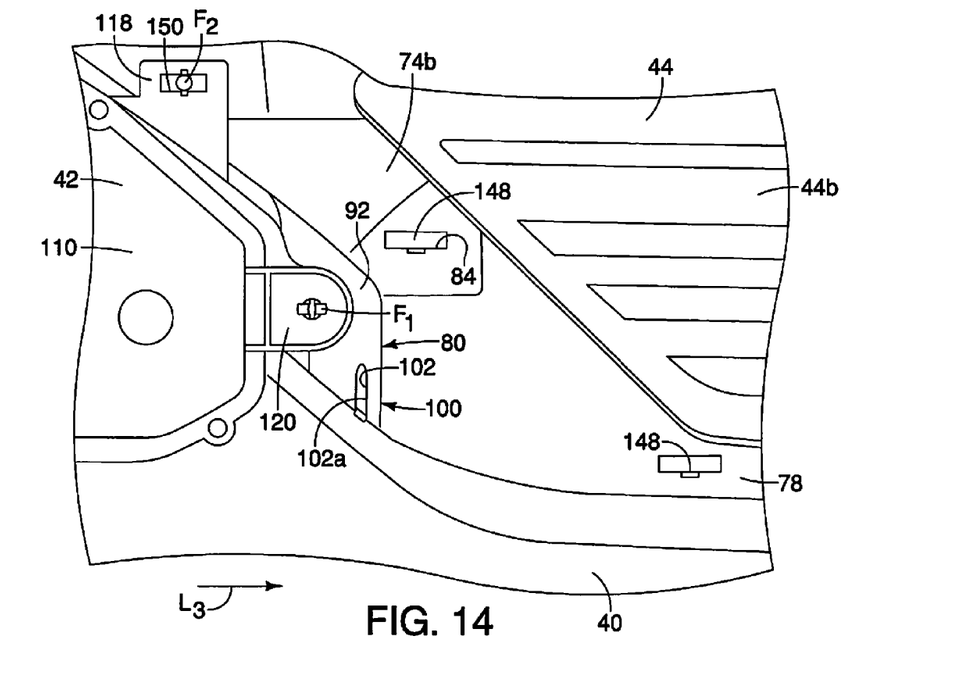
FIG. 14 is a rear view of the front end structure showing the projection of the headlamp assembly attached to the first attachment part of the flange of the bumper fascia and an attachment part of the front grille attached to the headlamp assembly in accordance with the first embodiment.
Figure 15:
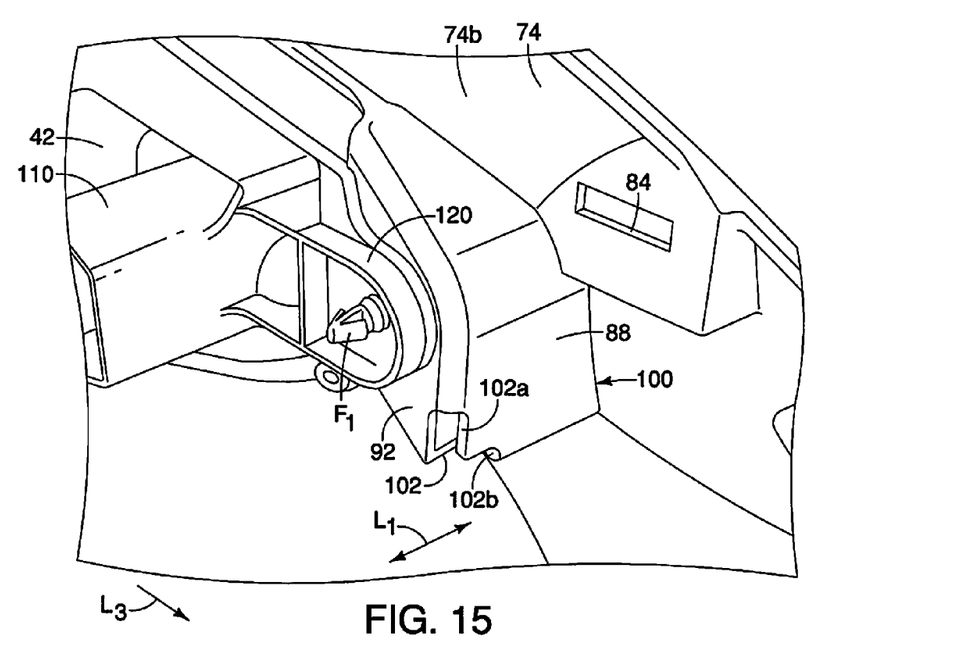
FIG. 15 is a rear perspective view of the front end structure showing the first attachment part of the flange of the bumper fascia, the doghouse structure and the controlled deformation zone in accordance with the first embodiment.
Figure 16:
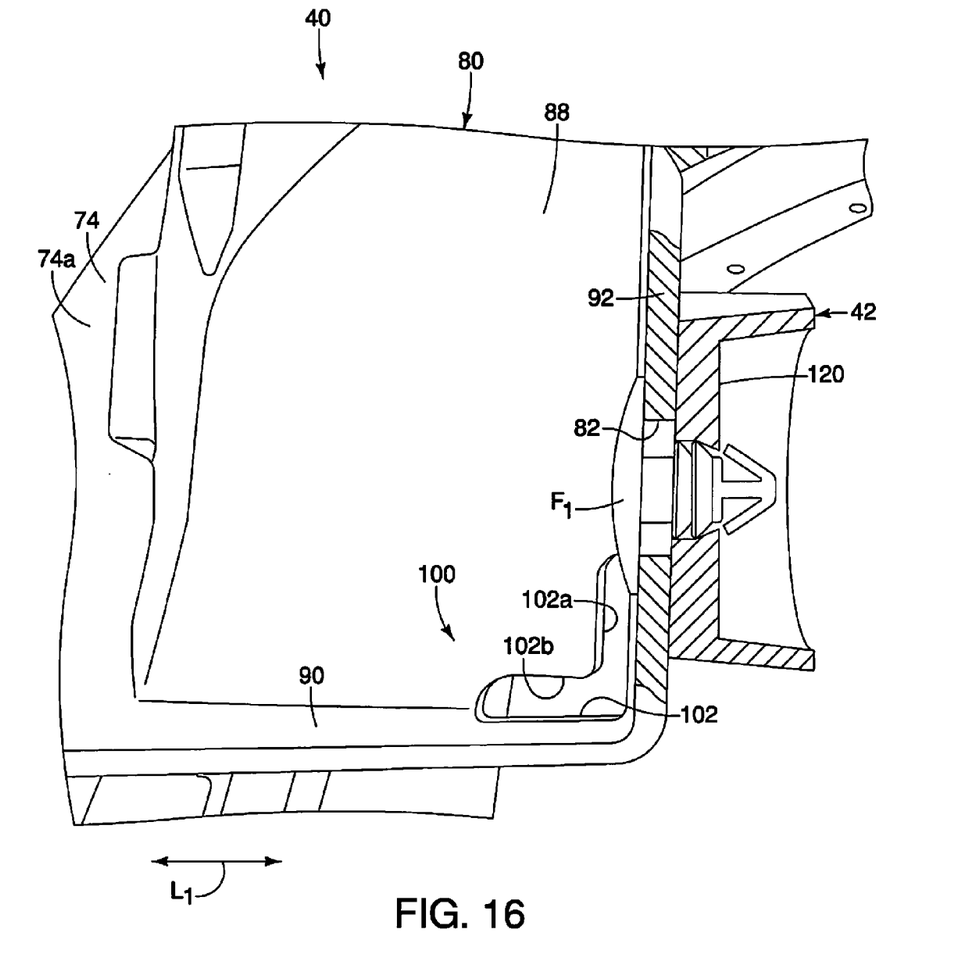
FIG. 16 is a side, partial cross-sectional view of the doghouse structure showing the first attachment part and the controlled deformation zone of the flange of the bumper fascia in accordance with the first embodiment.

As shown in FIGS. 3 and 6, the front grille 44 has a forward facing surface 44a. As shown in FIGS. 12 and 14, the front grille 44 has a rearward facing surface 44b. As shown in FIG. 3, the front grille 44 further has a lower edge 140, outboard edges 142 and an upper edge 144. The rearward facing surface 44b includes a plurality of upper attachment parts 146 (FIG. 2) that extend rearward from the upper edge 144, a plurality of fascia attachment parts 148 (FIG. 12) and a headlamp assembly attachment part 150 (FIGS. 9, 12 and 14).

As shown in FIGS. 3, 5 and 6, the headlamp assemblies 42 are installed and attached to the bumper fascia 40 prior to installation of the front grille 44. Specifically, in FIG. 5, one of the headlamp assemblies 42 is shown installed to the bumper fascia 40. Next, as shown in FIG. 6, the front grille 44 is installed. During installation of the headlamp assembly 42 to the bumper fascia 40, the fascia attachment part 114 is fastened to a rearward side of the main body 52 of the bumper fascia 40 via, for example, a threaded fastener (not shown), as is indicated in FIG. 12. The inner fender attachment part 116 aligns and attaches to the adjacent one of the inner fender 22 (attachment not shown in drawings). Further, the projection 120 aligns with the first attachment part 82 of the doghouse structure 80 of the bumper fascia 40, and the snap-fitting fastener $F_1$ fixes the projection 120 to the doghouse structure 80.

The front grille 44 installs to the bumper fascia 40 in the recessed area bounded between the inboard edges 62b of the projecting portions 54 of the bumper fascia 40 and above the main grille edge 64d of the main body 52 of the bumper fascia 40, as shown in FIG. 2. During installation of the front grille 44, the upper attachment parts 146 of the front grille 44 attach to the cross-member 76 (shown in FIGS. 4 and 12) of the bumper fascia 40. Further, the fascia attachment parts 148 attach to the lower flange 78 (shown in FIGS. 4, 12 and 14), and one of the fascia attachment parts 148 (a fourth attachment part) attaches to the second attachment part 84 (shown in FIGS. 12 and 14). Finally, as shown in FIGS. 8, 9, 12 and 14, the headlamp assembly attachment part 150 aligns with the upper grille attachment part 86 of the flange 74 of the bumper fascia 40 and aligns with the grille attachment part 118 of the housing 110 of the headlamp assembly 42, establishing an attachment between the bumper fascia 40, the headlamp assembly 42 and the front grille 44.

In the depicted embodiment, the fascia attachment parts 148 and the headlamp assembly attachment part 150 are all snap-fitting projections formed on the rearward facing surface 44b of the front grille 44 and are pressed into engagement with the opening that each of the attachment parts 148 and 150 attach to. However, it should be understood from the drawings and the description herein that these attachment parts of the front grille 44 can alternatively be removable fasteners.

Once the vehicle 10 is completely assembled, the rearward side of doghouse structure 80 is difficult to access due to the presence of, for example, a vehicle radiator and/or air conditioning condenser on a rearward side thereof. Further, the forward side of the doghouse structure 80 is covered by the front grille 44, as shown in FIGS. 2 and 6. Therefore, the use of the snap-fitting fastener $F_1$ makes removal and replacement of the headlamp assemblies 42 easier. In other words, the connection between the projection 120 and the first attachment part 82 of the doghouse structure 80 is a blind or hidden connection. Therefore, a snap-fitting connection therebetween makes vehicle maintenance, such as bulb replacement, simpler.

Once fully assembled, the front end structure 12 defines a contoured outer front surface of the vehicle 10. Specifically, the areas of the projecting portions 54 between the outboard edge 62a and the inboard edge 62b, the forward facing surface of the main body 52, the main lens area 124 of the lens 112 of the headlamp assembles 42 and the forward facing surface 44a of the front grille 44, together define the contoured outer front surface of the vehicle 10.

In the fully assembled state, the front end structure 12 has a number of structural relationships. For example, the outboard edge 142 of the front grille 44 and an upper inboard edge 126d of the lens 112 extend alongside one another above the projecting portion 54 of the bumper fascia 40. The outboard edge 142 extends further downward alongside the inboard edge 62b of the projecting portion 54 of the bumper fascia 40. The portion of the front grille 44 adjacent to the outboard edge 142 of the front grille 44 overlays the flange 128c of the lens 112 (a section of the lens 112) adjacent to the upper inboard edge 126d of the lens 112 above the projecting portion 54 of the bumper fascia 40. Further, the outboard edge 142 of the front grille 44 extends cornerlessly from the upper inboard edge 126d of the lens 112 and along the inboard side 54b of the projecting portion 54 of the bumper fascia 40.

FIG. 17 shows a portion of the doghouse structure 80 of the flange 74 of the projecting portion 54 of the bumper fascia 40 from within the engine compartment 24 of the vehicle 10, looking upward at the doghouse structure 80 and the attachment via the fastener $F_1$ to the projection 120 of the headlamp assembly 42. In FIG. 17, the controlled deformation zone 100 of the bumper fascia 40 (and the doghouse structure 80) is shown in an un-impacted state or orientation.

FIG. 18 is another perspective view of the doghouse structure 80 and the bumper fascia 40 from the same perspective as FIG. 17. However, in FIG. 18, the bumper fascia 50 has been impacted in a low speed impact event. As a result of the low speed impact event, the controlled deformation zone 100 of the bumper fascia 40, and in particular, the doghouse structure 80 is slightly deformed due to the presence of the slot 102. The positioning of the slot 102 in the doghouse structure 80 permits the areas around the doghouse structure 80 to absorb impact energy by deforming. Specifically, the upright surface 88, the lower surface 90 and the recessed surface 92 of the doghouse structure 80 undergo a limited amount of deformation in response to the low speed impact event. Meanwhile, as shown in FIG. 18, the projection 120 of the headlamp assembly 42 remains connected to the first attachment part 82 of the doghouse structure 80 with the doghouse structure in the impacted deformed orientation shown in FIG. 18.

The various features and structures of the vehicle 10 other than the front end structure 12 are conventional components that are well known in the art. Since vehicle features and structures are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the front end structure. Accordingly, these terms, as utilized to describe the present invention should be interpreted relative to a vehicle equipped with the front end structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiment according to the present invention are provided for illustration only, and not for the purpose of limiting the invention as defined by the appended claims and their equivalents.

What is claimed is:

1. A vehicle front end structure comprising
a bumper fascia having a main body and a projecting portion, the projecting portion extending upwardly from the main body and having an inboard side and an outboard side, the inboard side including a flange with a first attachment part and a second attachment part, the first attachment part of the flange of the projecting portion includes a controlled deformation zone such that in response to a low speed impact event areas of the first attachment part adjacent to the controlled deformation zone deform;
a headlamp assembly having a housing and a lens attached to the housing, the housing being installed to the bumper fascia above the main body and including a projection that extends in an inboard direction from an inboard side of the housing along a rearward surface of the flange of the projecting portion of the bumper fascia, the projection including a third attachment part that is releasably fastened to the first attachment part of the bumper fascia; and
a front grille installed to the bumper fascia above the main body and having a fourth attachment part releasably fastened to the second attachment part of the flange, the front grille covering the first attachment part and the third attachment part of the flange of the projecting portion, the projecting portion of the bumper fascia extending between an outboard edge the front grille and an inboard side of the lens such that the main body, the projecting portion, an outer surface of the lens and an outer surface of the front grille define a contoured outer front surface of a vehicle.

2. The vehicle front end structure according to claim 1, wherein
the controlled deformation zone is defined by a slot in a portion of flange adjacent to the first attachment part, the slot extending from an inboard surface of the flange to an outboard surface of the flange.

3. The vehicle front end structure according to claim 2, wherein
the slot extends in a horizontal direction.

4. The vehicle front end structure according to claim 2, wherein
the slot extends in a vertical direction.

5. A vehicle front end structure comprising
a bumper fascia having a main body and a projecting portion, the projecting portion extending upwardly from the main body and having an inboard side and an outboard side, the inboard side including a flange with a first attachment part and a second attachment part;
a headlamp assembly having a housing and a lens attached to the housing, the housing being installed to the bumper fascia above the main body and including a projection that extends in an inboard direction from an inboard side of the housing along a rearward surface of the flange of the projecting portion of the bumper fascia, the projection including a third attachment part that is releasably fastened to the first attachment part of the bumper fascia; and
a front grille installed to the bumper fascia above the main body and having a fourth attachment part releasably fastened to the second attachment part of the flange, the front grille covering the first attachment part and the third attachment part of the flange of the projecting portion, the projecting portion of the bumper fascia extending between an outboard edge the front grille and an inboard side of the lens such that the main body, the projecting portion, an outer surface of the lens and an outer surface of the front grille define a contoured outer front surface of a vehicle,
the flange of the projecting portion of the bumper fascia includes a doghouse structure with the first attachment part being defined by a fastener receiving opening that extends from a recessed surface of the doghouse to the rearward surface of the flange.

6. The vehicle front end structure according to claim 5, wherein
the doghouse structure includes a controlled deformation zone adjacent to the first attachment part such that in response to a low speed impact event areas of the doghouse structure adjacent to the controlled deformation zone deform.

7. The vehicle front end structure according to claim 6, wherein
the controlled deformation zone is defined by a slot in a portion of the doghouse structure adjacent to the first attachment part, the slot extending from an inboard surface of the doghouse structure to an outboard surface of the doghouse structure.

8. The vehicle front end structure according to claim 7, wherein
the slot extends in a horizontal direction.

9. The vehicle front end structure according to claim 7, wherein
the slot extends in a vertical direction.

10. The vehicle front end structure according to claim 5, wherein
the doghouse structure includes:
an upright surface that extends rearward from a forward facing surface of the flange,
a lower surface that extends rearward from the forward facing surface of the flange and extends in an outboard direction from the upright surface, and
the recessed surface, the recessed surface being perpendicular to the upright surface and extending from the upright surface to the lower surface.

11. The vehicle front end structure according to claim 10, wherein
the doghouse structure includes a controlled deformation zone located in an area corresponding to a convergence of the upright surface, the lower surface and the recessed surface.

12. The vehicle front end structure according to claim 11, wherein
the controlled deformation zone is defined by a slot that extends from a first side of the doghouse structure to a second side of the doghouse structure in the area corresponding to the convergence of the upright surface, the lower surface and the recessed surface.

13. The vehicle front end structure according to claim 5, wherein
the outboard edge of the front grille and an upper inboard edge of the lens extend alongside one another above the projecting portion of the bumper fascia.

14. The vehicle front end structure according to claim 13, wherein
the outboard edge of the front grille overlays a section of the lens adjacent to the upper inboard edge of the lens above the projecting portion of the bumper fascia.

15. The vehicle front end structure according to claim 14, wherein
the lens of the headlamp assembly has a lower inboard edge that extends upward that intersects with the upper inboard edge of the lens defining tapered inboard end, and
the projecting portion of the bumper fascia has an upwardly extending inboard edge and an upwardly extending outboard edge that define an upper tapered end located adjacent to the tapered inboard end of the lens and the front grill.

16. The vehicle front end structure according to claim 15, wherein
the first attachment part of the flange of the projecting portion includes a controlled deformation zone such that in response to a low speed impact event areas of the first attachment part adjacent to the controlled deformation zone deform.

17. The vehicle front end structure according to claim 16, wherein
the controlled deformation zone is defined by slot in a portion of the flange adjacent to the first attachment part, the slot extending from a first surface of the attachment flange to a second surface of the attachment flange.

18. The vehicle front end structure according to claim 13, wherein
the outboard edge of the front grille further extends cornerlessly from the upper inboard edge of the lens along the inboard side of the projecting portion of the bumper fascia.

19. A vehicle front end structure comprising
a bumper fascia having a main body and a projecting portion, the projecting portion extending upwardly from the main body and having an inboard side and an outboard side, the inboard side including a flange with a first attachment part and a second attachment part, the flange of the projecting portion includes a controlled deformation zone such that in response to a low speed impact event areas of the flange proximate the first attachment part and adjacent to the controlled deformation zone deform;

a headlamp assembly having a housing and a lens attached to the housing, the housing being installed to the bumper fascia above the main body and including a projection that extends in an inboard direction from an inboard side of the housing along a rearward surface of the flange of the projecting portion of the bumper fascia, the projection including a third attachment part that is releasably fastened to the first attachment part of the bumper fascia; and a front grille installed to the bumper fascia above the main body and having a fourth attachment part releasably fastened to the second attachment part of the flange, the front grille covering the first attachment part and the third attachment part of the flange of the projecting portion, the projecting portion of the bumper fascia extending between an outboard edge the front grille and an inboard side of the lens such that the main body, the projecting portion, an outer surface of the lens and an outer surface of the front grille define a contoured outer front surface of a vehicle.

* * * * *